US012639823B2

(12) United States Patent
Feng et al.

(10) Patent No.: US 12,639,823 B2
(45) Date of Patent: May 26, 2026

(54) IMAGE PROCESSING METHOD AND APPARATUS, DEVICE, AND STORAGE MEDIUM

(71) Applicant: Tencent Technology (Shenzhen) Company Limited, Shenzhen (CN)

(72) Inventors: Yunlong Feng, Shenzhen (CN); Xu Chen, Shenzhen (CN); Ying Tai, Shenzhen (CN); Chengjie Wang, Shenzhen (CN); Jilin Li, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 675 days.

(21) Appl. No.: 17/989,109

(22) Filed: Nov. 17, 2022

(65) Prior Publication Data

US 2023/0087489 A1     Mar. 23, 2023

Related U.S. Application Data

(63) Continuation of application No. PCT/CN2022/071306, filed on Jan. 11, 2022.

(30) Foreign Application Priority Data

Jan. 18, 2021     (CN) ......................... 202110062567.1

(51) Int. Cl.
*G06T 7/194*          (2017.01)
*G06T 7/11*           (2017.01)
*G06T 7/90*           (2017.01)

(52) U.S. Cl.
CPC ................ *G06T 7/194* (2017.01); *G06T 7/11* (2017.01); *G06T 7/90* (2017.01); *G06T 2207/30201* (2013.01)

(58) Field of Classification Search
CPC . G06T 7/194; G06T 2207/30201; G06T 7/90; G06T 7/11
See application file for complete search history.

(56) References Cited

U.S. PATENT DOCUMENTS 9,881,207 B1 * 1/2018 Nguyen ............... G06V 40/103
2014/0002746 A1 * 1/2014 Bai ........................... G06T 7/11
                                                    348/E5.077

(Continued)

FOREIGN PATENT DOCUMENTS

CN          103473780 A      12/2013
CN          108961303 A      12/2018

(Continued)

OTHER PUBLICATIONS

Hsieh, Chang-Lin, and Ming-Sui Lee. "Automatic trimap generation for digital image matting." 2013 Asia-Pacific Signal and Information Processing Association Annual Summit and Conference. IEEE, 2013. (Year: 2013).*

(Continued)

*Primary Examiner* — John Villecco
*Assistant Examiner* — Alexander John Rodgers
(74) *Attorney, Agent, or Firm* — Sughrue Mion, PLLC

(57) ABSTRACT

An image processing method and apparatus are provided. During image matting on an original image, a plurality of segmented images including different regions are first obtained through semantic segmentation. Further, according to the segmented images, lines of different widths are drawn on a contour line of a foreground region to obtain a target trimap. Finally, a target image is generated based on the target trimap. For the target trimap, because lines of different widths are drawn on the contour line of the foreground region, pertinent image matting may be implemented for different regions, so that image matting precision may be improved for a region requiring fine image matting, and (Continued)

2. Image semantic segmentation
1. Obtain an original image
3. Draw a line
4. Combination
5. Reassign a value to a face region
6. Original image
7. Target image
6. Image matting image matting precision of another region can also be ensured. In this way, a final image obtained through image matting is fine and natural.

20 Claims, 15 Drawing Sheets

(56)                References Cited

U.S. PATENT DOCUMENTS

| | | | | |
|---|---|---|---|---|
| 2014/0233849 | A1* | 8/2014 | Weng | G06T 19/20 |
| | | | | 382/154 |
| 2015/0213611 | A1* | 7/2015 | Dai | G06T 7/194 |
| | | | | 382/199 |
| 2018/0350030 | A1* | 12/2018 | Simons | G06T 5/50 |
| 2020/0175729 | A1* | 6/2020 | Lee | G06N 3/045 |
| 2020/0265582 | A1* | 8/2020 | Wang | G06T 7/90 |
| 2021/0019892 | A1* | 1/2021 | Zhou | G06V 40/162 |
| 2022/0044365 | A1* | 2/2022 | Zhang | G06T 3/40 |

FOREIGN PATENT DOCUMENTS

| | | |
|---|---|---|
| CN | 110751655 A | 2/2020 |
| CN | 111383232 A | 7/2020 |
| CN | 113570614 A | 10/2021 |

OTHER PUBLICATIONS

Qin, Siyang, Seongdo Kim, and Roberto Manduchi. "Automatic skin and hair masking using fully convolutional networks." 2017 IEEE International Conference on Multimedia and Expo (ICME). IEEE, 2017. (Year: 2017).*

Zhu, Huijun, and Yong Liu. "Automatic hair segmentation in complex background." 2019 IEEE International Conference on Robotics and Biomimetics (ROBIO). IEEE, 2019. (Year: 2019).*

Lestari, Puji, and Hans-Peter Schade. "Efficient Human Detection Algorithm using Color & Depth information with Accurate Outer Boundary Matching." 2019 International Conference on Computer, Control, Informatics and its Applications (IC3INA). IEEE, 2019. (Year: 2019).*

Yağiz Aksoy, et al., "Semantic Soft Segmentation", ACM Trans. Graph., Aug. 2018, vol. 37, No. 4, Article 72 (13 pages).

Yağiz Aksoy, et al., "Designing Effective Inter-Pixel Information Flow for Natural Image Matting", IEEE, 2017, pp. 228-236.

Carlos Orrite, et al., "Portrait Segmentation by Deep Refinement of Image Matting", IEEE, 2019, pp. 1495-1499.

Yanan Sun, et al., "Semantic Image Matting", 2021 IEEE/CVF Conference on Computer Vision and Pattern Recognition (CVPR), 2021, pp. 11115-11124.

Extended European Search Report issued May 28, 2024 in Application No. 22738995.4.

International Search Report for PCT/CN2022/071306 dated Apr. 2, 2022.

Written Opinion for PCT/CN2022/071306 dated Apr. 2, 2022.

Communication dated Apr. 9, 2025 in Chinese Application No. 202110062567.1.

* cited by examiner

Feature   Convolution   Down-   Upsampling
map          unit        sampling

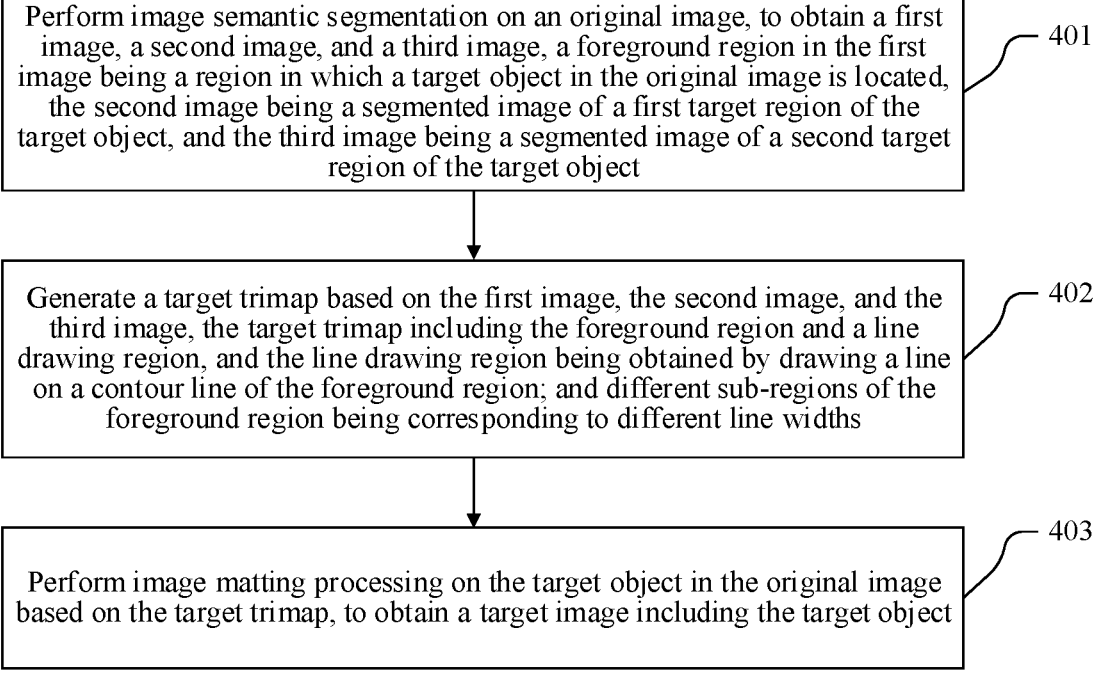

Perform image semantic segmentation on an original image, to obtain a first image, a second image, and a third image, a foreground region in the first image being a region in which a target object in the original image is located, the second image being a segmented image of a first target region of the target object, and the third image being a segmented image of a second target region of the target object — 401

Generate a target trimap based on the first image, the second image, and the third image, the target trimap including the foreground region and a line drawing region, and the line drawing region being obtained by drawing a line on a contour line of the foreground region; and different sub-regions of the foreground region being corresponding to different line widths — 402

Perform image matting processing on the target object in the original image based on the target trimap, to obtain a target image including the target object — 403

FIG. 4

This method

Related
technology

IMAGE PROCESSING METHOD AND APPARATUS, DEVICE, AND STORAGE MEDIUM

CROSS REFERENCE TO RELATED APPLICATION(S)

This application is a continuation of PCT/CN2022/071306 filed on Jan. 11, 2022 and claims priority to Chinese Patent Application No. 202110062567.1, filed with the China National Intellectual Property Administration on Jan. 18, 2021 and entitled "IMAGE PROCESSING METHOD AND APPARATUS, DEVICE, AND STORAGE MEDIUM", both of which are incorporated herein by reference in their entireties.

FIELD

The disclosure relates to the field of artificial intelligence (AI) technologies, and in particular, to an image processing method and apparatus, a device, a storage medium, and a computer program product.

BACKGROUND

With the development of computer technologies, image processing is becoming prevalent. Image matting is a widely used image processing technology, which is specifically separating a foreground region in an image from a background region in the image.

In the related art, image matting is usually implemented through segmentation. Specifically, each pixel in an image is classified to obtain block segmentation results of different categories, and then a foreground region, such as a portrait region or a building region, in the image is obtained.

However, in the foregoing method, a fixed category is given for each pixel, which is likely to cause a rough edge of the foreground region, resulting in a poor image matting effect.

SUMMARY

Embodiments of the disclosure provide an image processing method and apparatus, a device, a storage medium, and a computer program product.

According to one aspect, an image processing method is provided, performed by a computer device, the method including:

performing image semantic segmentation on an original image, to obtain a first image, a second image, and a third image, a foreground region in the first image being a region in which a target object in the original image is located, the second image being a segmented image of a first target region of the target object, and the third image being a segmented image of a second target region of the target object; and sub-regions of the foreground region including the first target region and the second target region;

generating a target trimap based on the first image, the second image, and the third image, the target trimap including the foreground region and a line drawing region, and the line drawing region being obtained by drawing a line on a contour line of the foreground region; and different sub-regions of the foreground region being corresponding to different line widths; and performing image matting processing on the target object in the original image based on the target trimap, to obtain a target image including the target object.

According to another aspect, an image processing apparatus is provided, the apparatus including:

an image segmentation module, configured to perform image semantic segmentation on an original image, to obtain a first image, a second image, and a third image, a foreground region in the first image being a region in which a target object in the original image is located, the second image being a segmented image of a first target region of the target object, and the third image being a segmented image of a second target region of the target object; and sub-regions of the foreground region including the first target region and the second target region;

a trimap generation module, configured to generate a target trimap based on the first image, the second image, and the third image, the target trimap including the foreground region and a line drawing region, and the line drawing region being obtained by drawing a line on a contour line of the foreground region; and different sub-regions of the foreground region being corresponding to different line widths; and an image matting module, configured to perform image matting processing on the target object in the original image based on the target trimap, to obtain a target image including the target object.

Another aspect provides a computer device, including one or more processors and a memory, the memory being configured to store at least one computer-readable instruction, the at least one computer-readable instruction being loaded and executed by the one or more processors to implement the operations performed in the image processing method in the embodiments of the disclosure.

Another aspect provides one or more computer-readable storage media, storing at least one computer-readable instruction, the at least one computer-readable instruction being loaded and executed by one or more processors to implement the operations performed in the image processing method in the embodiments of the disclosure.

Another aspect provides a computer program product, including computer-readable instructions, the computer-readable instructions being stored in a computer-readable storage medium. One or more processors of a computer device read the computer-readable instructions from the computer-readable storage medium and execute the computer-readable instructions, to cause the computer device to perform the image processing method provided in the foregoing various embodiments.

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

FIG. 4 is a flowchart of an image processing method according to an example embodiment of the disclosure.

DESCRIPTION OF EMBODIMENTS

To make the objectives, technical solutions, and advantages of the disclosure clearer, the following further describes the implementations of the disclosure in detail with reference to the accompanying drawings.

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with the disclosure. Instead, they are merely examples of apparatuses and methods consistent with some aspects of the disclosure as recited in the appended claims.

The terms "first", "second", and the like in the disclosure are used for distinguishing between same items or similar items of which effects and functions are basically the same. The "first", "second", and "n$^{th}$" do not have a dependency relationship in logic or time sequence, and a quantity and an execution order thereof are not limited. It is to be further understood that, although the terms such as first and second are used to describe various elements in the following description, these elements are not to be limited to these terms.

These terms are merely used for distinguishing one element from another element. For example, a first image may be referred to as a second image, and similarly, a second image may be referred to as a first image without departing from the scope of the various examples. Both the first image and the second image may be images, and in some cases, may be separate and different images.

At least one refers to one or more than one. In an example, at least one image may be images with any integer number greater than or equal to one, such as one image, two images, or three images. A plurality of refers to two or more than two. In an example, a plurality of images may be images with any integer number greater than or equal to two, such as two images or three images.

An image processing solution provided in the embodiments of the disclosure may use a computer vision technology in AI technologies. In an example, semantic segmentation processing in the disclosure uses the computer vision technology. Specifically, in the image processing solution provided in the embodiments of the disclosure, an HRNET may be used to extract image feature information, and an OCR technology may be used to compute a semantic category of each pixel in an image.

Figure 1:
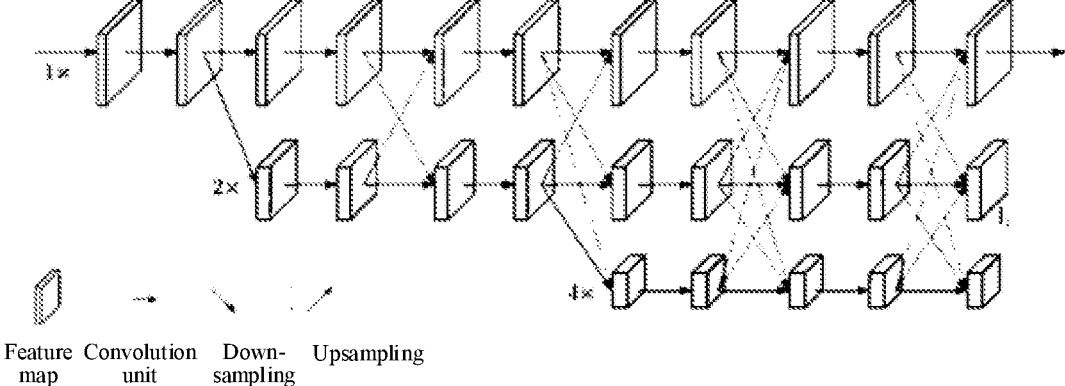
FIG. 1 is a schematic structural diagram of a high resolution network (HRNET) according to an example embodiment of the disclosure.

The HRNET is a computation model for obtaining image feature information, which can maintain a high resolution representation during all operations. The HRNET starts with a set of high resolution convolutions, and then low resolution convolution branches are added step by step and connected in parallel. FIG. 1 is a schematic structural diagram of an HRNET according to the disclosure. As shown in FIG. 1, in the network, feature maps of different resolutions are connected in parallel, and each resolution occupies one channel. In the entire process, parallel operation combinations continuously exchange information through multi-resolution fusion.

The OCR is a computation model for representing a semantic category of a pixel in an image.

Figure 2:
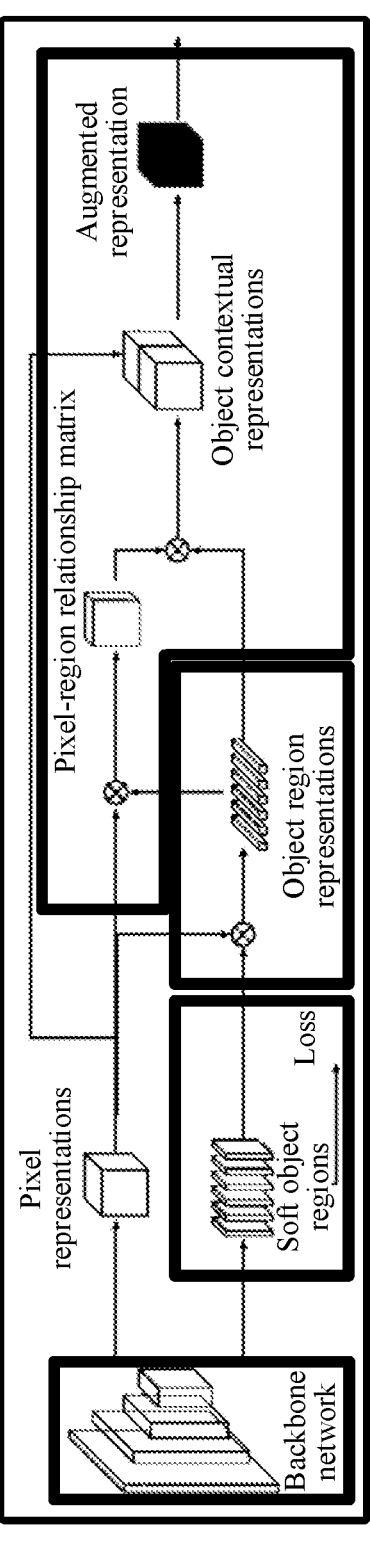
FIG. 2 is a schematic structural diagram of an object-contextual representation (OCR) according to an example embodiment of the disclosure.

FIG. 2 is a schematic structural diagram of an OCR according to the disclosure. As shown in FIG. 2: First, a rough semantic segmentation result, that is, soft object regions, is obtained by using an intermediate layer of a backbone network. Second, K vectors, that is, object region representations, are obtained through computation by using pixel representations outputted by a deep layer of the backbone network and the soft object regions, K>1 and each vector being corresponding to one semantic category representation. Third, a relationship matrix between the pixel representations and the object region representations is computed. Fourth, according to values of a pixel representation of each pixel and each object region representation in the relationship matrix, weighted summation is performed on all the object region representations, to obtain an OCR. Finally, a contextual information augmented representation is obtained based on the OCR and the pixel representations. The augmented representation may be used for predicting a semantic category of each pixel.

The following briefly introduces key terms or abbreviations that may be used in the image processing solution provided in the embodiments of the disclosure.

Semantic segmentation: It is a process of assigning, for an inputted image, pixels with the same semantics to the same part or region based on a semantic understanding of each pixel, to obtain several different semantic regions.

Foreground: It is a subject in an image, such as a portrait in portrait photography.

Background: It is an environment in which a subject in an image is located, such as a landscape, a road, or a building in which a character is located in portrait photography.

Image matting: It is an image processing technology of separating foreground of an image from background.

Trimap: It is an image including three labels: foreground, background, and foreground-background mixed regions, and is usually used together with an original image as an input of an image matting model. In the following embodiments, the foreground-background mixed region is also referred to as a line drawing region.

Identifier value: It is a value for identifying a color of a pixel in an image. In an example, an identifier value of a pixel is 255, indicating that a red-green-blue (RGB) color value of the pixel is (255, 255, 255), which is white. In another example, an identifier value of a pixel is 0, indicating that an RGB color value of the pixel is (0, 0, 0), which is black. In another example, an identifier value of a pixel is 128, indicating that an RGB color value of the pixel is (128, 128, 128), which is gray.

Open source computer vision library (OpenCV): It is a cross-platform computer vision and machine learning software library that may run on various operating systems. OpenCV may be configured to develop real-time image processing, computer vision, and pattern recognition programs.

findContours: It is a function in OpenCV and configured to detect a contour in an image.

drawContours: It is a function in OpenCV and configured to draw a contour in an image.

Image matting model: It is a computation model for computing, according to an original image and a trimap, a probability of each pixel in the original image belonging to foreground. In an example, the image matting model includes IndexNet model, GCAMatting model, and ContextNet model.

An implementation environment involved in the image processing method provided in some embodiments of the disclosure is described below in detail.

Figure 3:
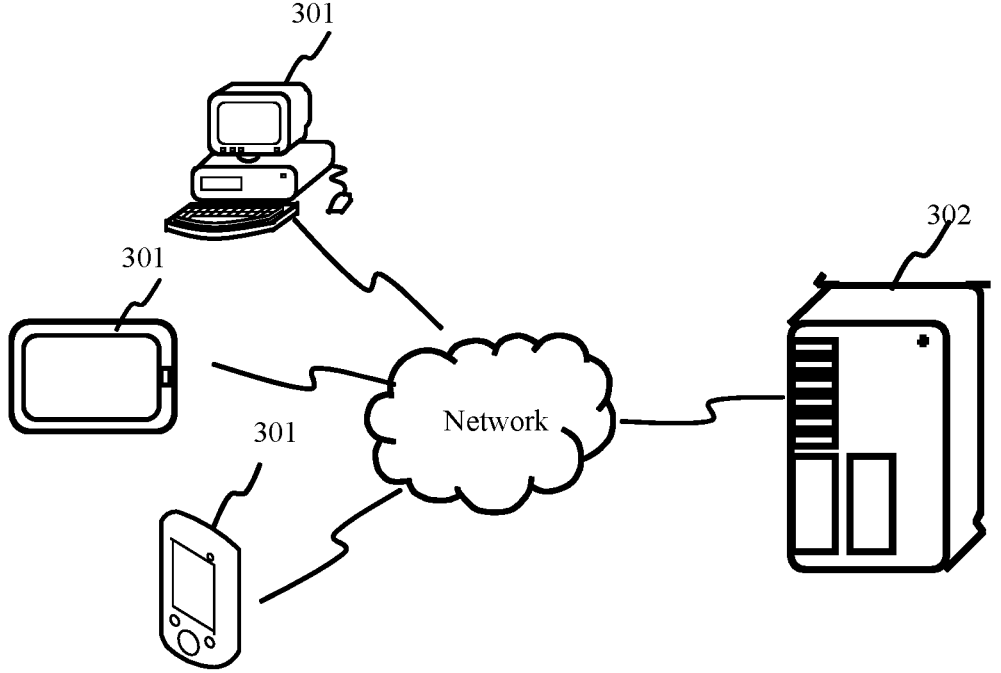
FIG. 3 is a schematic diagram of an implementation environment of an image processing method according to an example embodiment of the disclosure.

FIG. 3 is a schematic diagram of an implementation environment of an image processing method according to an example embodiment of the disclosure. The implementation environment includes: a terminal 301 and a server 302.

The terminal 301 and the server 302 may be directly or indirectly connected in a wired or wireless communication manner. This is not limited in the disclosure. In some embodiments, the terminal 301 is a smartphone, a tablet computer, a notebook computer, a desktop computer, or the like, but is not limited thereto. An application may be installed and run on the terminal 301. In some embodiments, the application is a social application, an image processing application, a photographing application, or the like. In an example, the terminal 301 is a terminal used by a user, and a social application is run on the terminal 301, and the user may extract a portrait in a picture by using the social application.

The server 302 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The server 302 is configured to provide a background service for the application run on the terminal 301.

In some embodiments, during image processing, the server 302 undertakes primary computing work, and the terminal 301 undertakes secondary computing work. Alternatively, the server 302 undertakes secondary computing work, and the terminal 301 undertakes primary computing work. Alternatively, the server 302 or the terminal 301 may undertake computing work separately.

In some embodiments, the terminal 301 generally refers to one of a plurality of terminals. In some embodiments, the terminal 301 is merely used as an example for description. A person skilled in the art can learn that, there may be more terminals 301. In an example, there are dozens, hundreds, or more terminals 301. In this case, the implementation environment of the image processing method also includes other terminals. The number and the device type of the terminals are not limited in some embodiments of the disclosure.

In some embodiments, the wireless network or the wired network uses a standard communication technology and/or protocol. The network is usually the Internet, but may alternatively be any other networks, including but not limited to a local area network (LAN), a metropolitan area network (MAN), a wide area network (WAN), a mobile, wired, or wireless network, or any combination of a dedicated network or a virtual dedicated network. In some embodiments, a technology and/or format including HTML, extensible markup language (XML), and the like are used to represent data exchanged by using a network. In addition, all or some links may be encrypted by using conventional encryption technologies such as secure socket layer (SSL), transport layer security (TLS), virtual private network (VPN), and internet protocol security (IPsec). In some other embodiments, custom and/or dedicated data communication technologies may also be used in place of or in addition to the foregoing data communication technologies.

In the embodiments of the disclosure, an image processing method is provided, which can meet requirements for extracting a target object in various scenarios. Moreover, for an original image including a target object, local regions such as a first target region and a second target region with more details of the target object may be automatically extracted from the original image, and an image matting effect is fine and natural. FIG. 4 is a flowchart of an image processing method according to an example embodiment of the disclosure. As shown in FIG. 4, in some embodiments of the disclosure, the method being applied to a computer device is used as an example for description. The computer device may be a terminal or a server. The method includes the following operations:

401. Perform image semantic segmentation on an original image, to obtain a first image, a second image, and a third image, a foreground region in the first image being a region in which a target object in the original image is located, the second image being a segmented image of a first target region of the target object, and the third image being a segmented image of a second target region of the target object.

In some embodiments of the disclosure, the original image is an image requiring image matting. The target object is an object in the original image that needs to be separated out to generate a target image.

The first image, the second image, and the third image are essentially segmented images. The first image is a segmented image obtained through segmentation on the entire target object, and therefore, the foreground region in the first image includes all elements of the target object in the original image. The second image is a segmented image obtained through segmentation on a local part, that is, the first target region, of the target object, and therefore, a foreground region in the second image includes all elements in the first target region of the target object, and in the second image, a region other than the first target region belongs to a background region. Similarly, the third image is a segmented image obtained through segmentation on a local part, that is, the second target region, of the target object, and therefore, a foreground region in the third image includes all elements in the second target region of the target object, and in the third image, a region other than the second target region belongs to a background region.

It may be understood that, the target object may include at least one of a character portrait, an animal image, a plant image, or the like in the original image.

It may be understood that, because the foreground region of the target object in the first image is a region for representing the entire target object, and the first target region and the second target region are regions of local parts of the target object, the first target region and the second target region are sub-regions in the foreground region of the target object in the first image.

In an example embodiment, the first target region may be a region in the target object that requires fine image matting. The second target region may be a region in the target object that is related to the first target region and whose fine image matting requirement is different from that of the first target region. Specifically, the fine image matting requirement of the second target region may be lower than the fine image matting requirement of the first target region. In an example, detail information of the second target region is lower than detail information of the first target region, and therefore, the fine image matting requirement of the second target region is lower than that of the first target region.

In an example embodiment, if the target object is a character portrait, the first target region and the second target region may be a hair region and a face region, respectively.

In an example embodiment, if the target object is an animal image, the first target region and the second target region may be a hair region and a head region, respectively.

In an example embodiment, if the target object is a plant image, the first target region and the second target region may be a leaf region and a branch region, respectively.

The target object may be a portrait of a real person, or may be a portrait of a cartoon character or a portrait of an animation character.

402. Generate a target trimap based on the first image, the second image, and the third image, the target trimap including the foreground region and a line drawing region, and the line drawing region being obtained by drawing a line on a contour line of the foreground region; and different sub-regions of the foreground region being corresponding to different line widths.

In some embodiments of the disclosure, the sub-regions are partial regions in the foreground region, and include the first target region, the second target region, and the like.

403. Perform image matting processing on the target object in the original image based on the target trimap, to obtain a target image including the target object.

In some embodiments of the disclosure, the image matting processing is a process of separating the target object in the original image from a background region, to obtain a target image.

In some embodiments of the disclosure, during image matting on an original image, a plurality of segmented images including different regions are first obtained through semantic segmentation. Further, according to the segmented images, lines of different widths are drawn on a contour line of a foreground region to obtain a target trimap. Finally, a target image is generated based on the target trimap. For the target trimap, because lines of different widths are drawn on the contour line of the foreground region, pertinent image matting may be implemented for different regions, so that image matting precision may be improved for a region requiring fine image matting, and image matting precision of another region may also be ensured. In this way, a final image obtained through image matting is fine and natural. In addition, the image matting process is fully automated, which greatly improves image matting efficiency.

FIG. 4 merely shows a basic procedure of the disclosure. The following further describes, based on a specific implementation, the solution provided in the disclosure.

Figure 5:
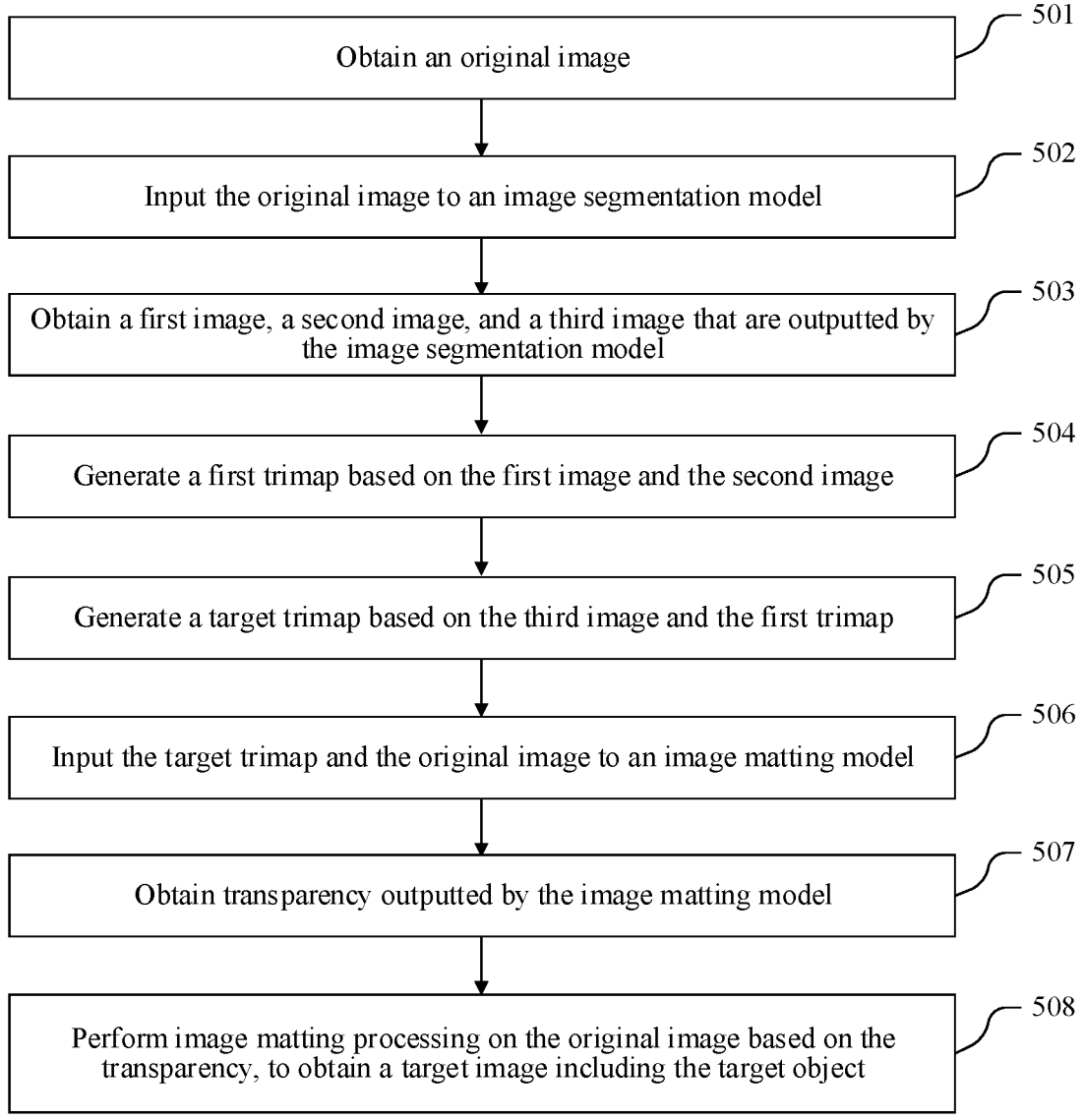
FIG. 5 is a flowchart of another image processing method according to an example embodiment of the disclosure.

FIG. 5 is a flowchart of another image processing method according to an example embodiment of the disclosure. In some embodiments, the first target region is a hair region, and the second target region is a face region. As shown in FIG. 5, in some embodiments of the disclosure, the method being applied to a terminal is used as an example for description. The method includes the following operations:

501. Obtain an original image.

In some embodiments of the disclosure, the terminal provides an image matting function, a user may perform an image matting operation on the terminal, and the terminal obtains the original image in response to the image matting operation. In some embodiments, the original image is a local image stored on the terminal, or the original image is an online image. A source of the original image is not limited in some embodiments of the disclosure.

In some embodiments, the terminal displays an image processing interface for the original image, the image processing interface including an image matting option, a cropping option, and the like, the user may perform a selection operation on the image matting option, and the terminal obtains the original image in response to the selection operation.

In some embodiments, the terminal displays an image processing interface, the image processing interface including an image matting option, the user may perform a selection operation on the image matting option, the terminal displays an image selection interface in response to the selection operation, the user may perform a clicking/tapping operation on an image on which image matting is to be performed, to select an original image for image matting, and the terminal obtains the original image in response to the clicking/tapping operation.

A manner of obtaining the original image by the terminal is not limited in some embodiments of the disclosure.

502. Input the original image to an image segmentation model.

In some embodiments of the disclosure, the image segmentation model is configured to compute, according to the inputted original image, a semantic category of each pixel in the original image, to output at least one image of the original image.

In some embodiments, the image segmentation model is an HRNET-OCR model, which is a computation model that integrates an HRNET model and an OCR model. A computation process of the HRNET-OCR model is as follows: First, feature extraction is performed on the original image by using the HRNET model, to obtain feature information of the original image. Then, the obtained feature information is inputted to a backbone network of the OCR model. Next, a semantic category of each pixel in the original image is computed based on the OCR model. In an example, the semantic category includes hair, nose, eye, torso, clothing, or building. Finally, at least one image of the original image is outputted based on the semantic category of each pixel. A specific computation process of the HRNET-OCR model is described in detail above with reference to FIG. 1 and FIG. 2, and therefore, details are not described herein again.

In actual application, at least one image of the original image may be outputted by adjusting some structures in the HRNET-OCR model. A structural composition of the HRNET-OCR model is not limited in some embodiments of the disclosure. In some other embodiments, the image segmentation model may alternatively be implemented by using another network model. A type of the image semantic segmentation model is not limited in some embodiments of the disclosure.

503. Obtain a first image, a second image, and a third image that are outputted by the image segmentation model. The first image includes a foreground region in which a target object in the original image is located, the second image is a segmented image of a hair region of the target object, and the third image is a segmented image of a face region of the target object.

In some embodiments of the disclosure, after the image segmentation model classifies each pixel in the original image, the terminal may obtain three segmented images, that is, the first image, the second image, and the third image, in this operation. Each image includes two regions, and the two regions are labeled by using different identifier values. In an example, for the first image, the first image includes the foreground region and a background region, an identifier value of each pixel in the foreground region being 255, and an identifier value of each pixel in the background region being 0. In actual application, a developer may flexibly set the identifier values as required, which is not limited in some embodiments of the disclosure.

Figure 6:
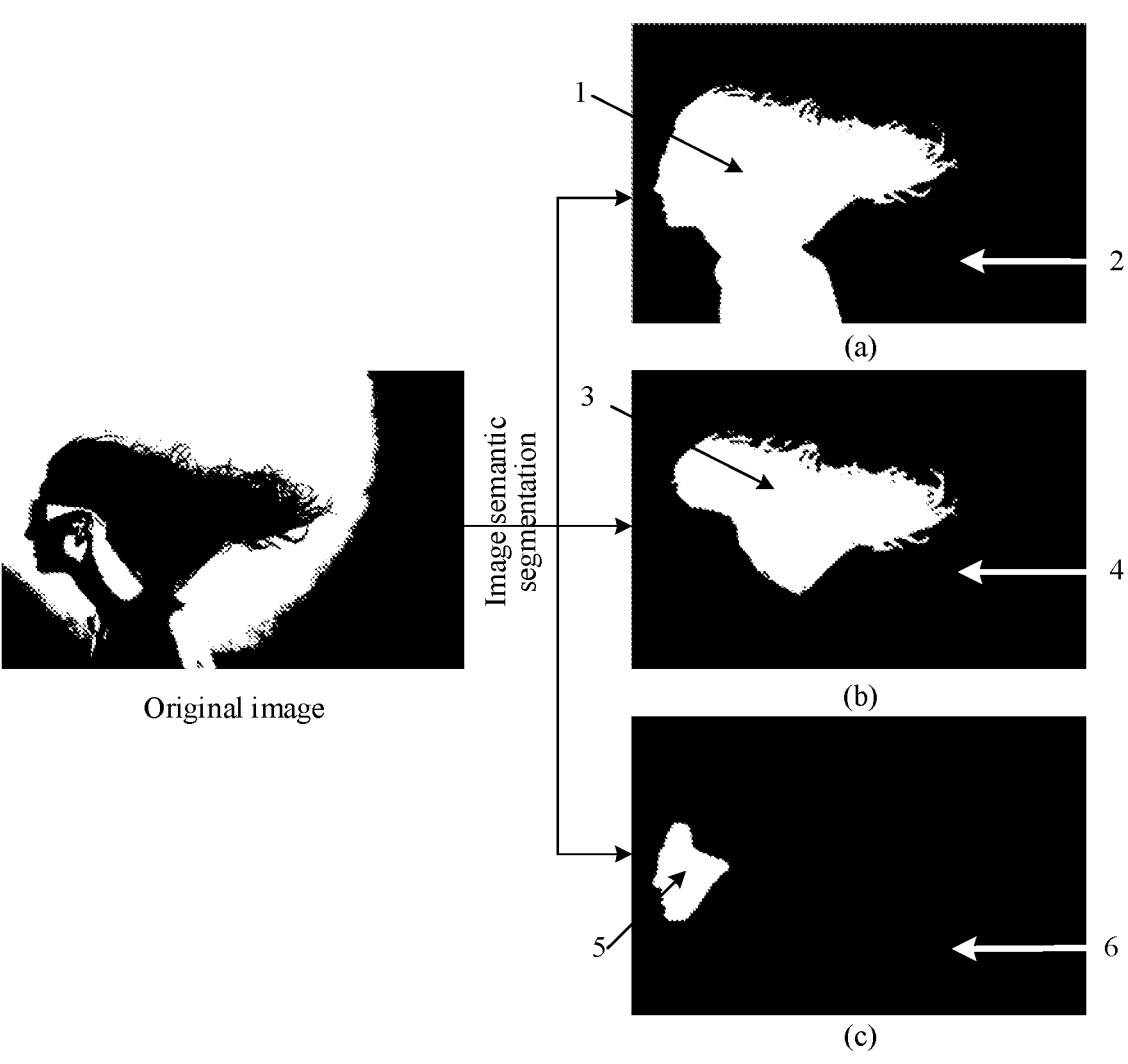
FIG. 6 is a schematic diagram of an image semantic segmentation result according to an example embodiment of the disclosure.

In an example, FIG. 6 is a schematic diagram of an image semantic segmentation result according to an example embodiment of the disclosure. As shown in FIG. 6, the original image is a character portrait, an image shown in (a) of FIG. 6 is a first image, the first image includes a foreground region 1 and a background region 2, and the foreground region 1 includes all elements of the character portrait. An image shown in (b) of FIG. 6 is a second image, and the second image includes a hair region 3 and a background region 4. An image shown in (c) of FIG. 6 is a third image, and the third image includes a face region 5 and a background region 6.

504. Generate a first trimap based on the first image and the second image, the first trimap including the foreground region, a first line drawing sub-region, and a second line drawing sub-region.

In some embodiments of the disclosure, the first line drawing sub-region covers a contour line on a side of the hair region that is close to the background region in the first image, the second line drawing sub-region covers a contour line of a non-hair region in the foreground region, and the non-hair region is a region in the foreground region other than the hair region. A first line width being greater than a second line width. The first line width is used for drawing the first line drawing sub-region, and the second line width is used for drawing the second line drawing sub-region.

The first trimap further includes a background region, and identifier values of the first line drawing sub-region and the second line drawing sub-region are different from an identifier value of the foreground region, and different from an identifier value of the background region. In an example, an identifier value of each pixel in the foreground region is 255, an identifier value of each pixel in the background region is 0, and an identifier value of each pixel in the first line drawing sub-region and the second line drawing sub-region is 128.

In actual application, a developer may flexibly set an identifier value in a line drawing region as required, which is not limited in some embodiments of the disclosure.

Figure 7:
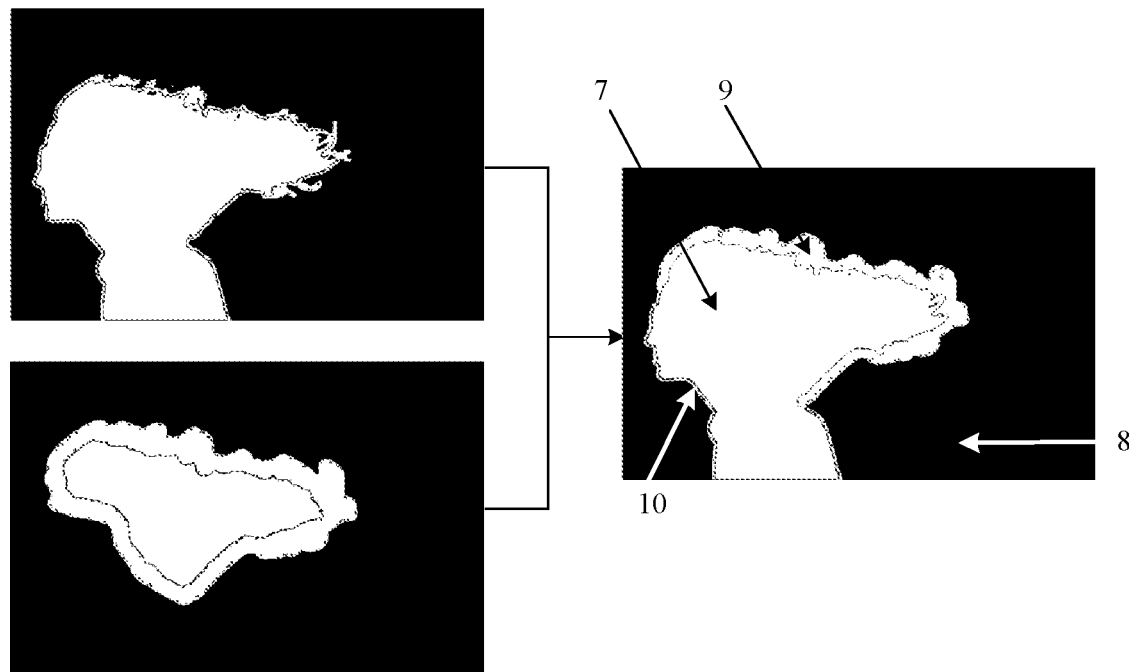
FIG. 7 is a schematic diagram of a first trimap according to an example embodiment of the disclosure.

FIG. 7 is a schematic diagram of a first trimap according to an example embodiment of the disclosure. As shown in a right diagram of FIG. 7, the first trimap includes a foreground region 7, a background region 8, a first line drawing sub-region 9, and a second line drawing sub-region 10. The first line drawing sub-region 9 is drawn according to the first line width, and the second line drawing sub-region 10 is drawn according to the second line width.

In addition, in some embodiments of the disclosure, foreground regions in different images have different region ranges, and background regions in different images have different region ranges. In an example, referring to the background region 2 and the background region 4 in FIG. 6, the two are background regions but have obviously different region ranges. In another example, referring to the foreground region 1 in FIG. 6 and the foreground region 7 in FIG. 7, the two are background regions but have slightly different region ranges.

The following describes in detail a specific implementation of generating the first trimap by the terminal in this operation, including the following operation 5041 to operation 5045:

5041. Obtain a complete contour line of the foreground region in the first image.

The complete contour line of the foreground region is a boundary line between the foreground region and the background region. The terminal obtains, based on the obtained first image, the complete contour line of the foreground region in the first image by using a contour detection algorithm. In some embodiments, the contour detection algorithm may be implemented by using a findContours function, which is not limited in some embodiments of the disclosure.

5042. Draw a line on the complete contour line of the foreground region based on the second line width, to obtain a second trimap.

The second trimap includes the foreground region and a third line drawing sub-region, and the third line drawing sub-region covers the complete contour line of the foreground region. The second line width is computed according to a size of the original image. In some embodiments, the second line width may be computed by using the following formula (1):

$$S = \frac{\min(\text{width, height})}{1000} * N \tag{1}$$

In the formula, S is the second line width, width and height are a width and a height of the original image, respectively, min( ) is a minimum function, min(width, height) indicates to select a minimum value from the width and the height of the original image, and N is a default line size. In an example, N may be 17. This is not limited in some embodiments of the disclosure.

After obtaining the complete contour line of the foreground region, the terminal draws a line on the complete contour line according to the second line width by using a contour drawing algorithm, an identifier value of the line being different from the identifier values of the foreground region and the background region. In some embodiments, the contour drawing algorithm may be implemented by using a drawContours function. In an example, the identifier value of the foreground region is 255, the identifier value of the background region is 0, and a line is drawn on the complete contour line of the foreground region by using the following formula (2):

$$cv::drawContours(seg\ Result,contours,-1,Scalar(128, \\ 128,128),S) \qquad (2)$$

In the formula, segResult is the first image, contours is the complete contour line of the foreground region that is detected by using the findContours function, −1 indicates to perform the operation on all contour lines, Scalar is an identifier value, Scalar(128, 128, 128) indicates to set color values of R, G, and B channels to 128, and Sis the second line width.

The foregoing line drawing manner is performing the operation on the obtained complete contour line, that is, covering the complete contour line. In an example, the complete contour line obtained by using the findContours function includes pixels A1 to A10, and the operation is performed on the pixels, to draw a line. That is, the third line drawing sub-region obtained by drawing a line covers the foreground region in the first image, as well as the background region in the first image.

Figure 8:
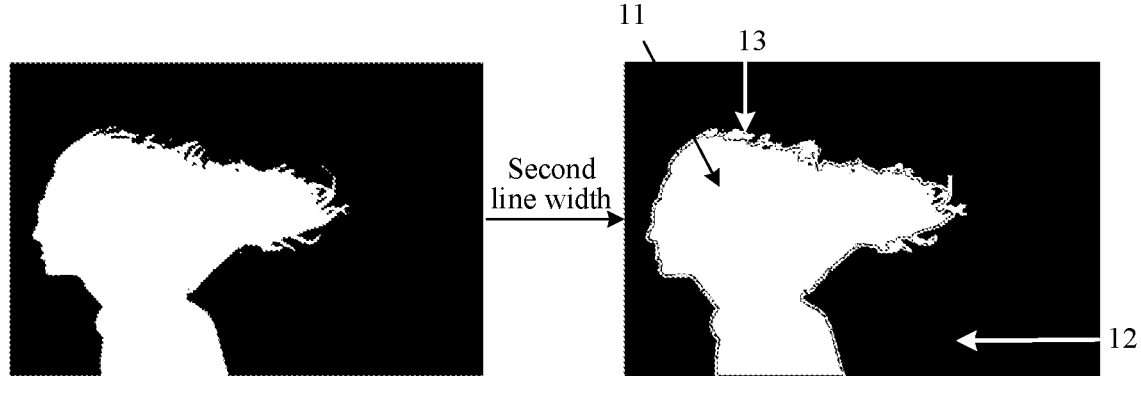
FIG. 8 is a schematic diagram of a second trimap according to an example embodiment of the disclosure.

FIG. 8 is a schematic diagram of a second trimap according to an example embodiment. A left diagram of FIG. 8 is the first image, and a right diagram of FIG. 8 is the second trimap. The second trimap includes a foreground region 11, a background region 12, and a third line drawing sub-region 13. The third line drawing sub-region 13 is drawn according to the second line width.

5043. Obtain a complete contour line of the hair region in the second image.

The complete contour line of the hair region is a boundary line between the hair region and the background region. The terminal obtains, based on the obtained second image, the complete contour line of the hair region in the second image by using the contour detection algorithm. In some embodiments, the contour detection algorithm may be implemented by using the findContours function, which is not limited in some embodiments of the disclosure.

5044. Draw a line on the complete contour line of the hair region based on the first line width, to obtain a third trimap.

The third trimap includes the hair region and a fourth line drawing sub-region, and the fourth line drawing sub-region covers the complete contour line of the hair region. The first line width is M times the second line width, M being greater than 1. In an example, the first line width is three times the second line width. That is, when the second line width is S, the first line width is S*3, which is not limited in some embodiments of the disclosure.

A manner of drawing a line on the complete contour line of hair region in this operation is similar to that in operation 5042, and therefore, details are not described herein again, and only the following formula (3) is used as an example for description:

$$cv::drawContours(segResultHair,contours,-1,Scalar \\ (128,128,128),S*3) \qquad (3)$$

In the formula, segResultHair is the second image, contours is the complete contour line of the hair region that is detected by using the findContours function, −1 indicates to perform the operation on all contour lines, Scalar is an identifier value, Scalar(128, 128, 128) indicates to set color values of R, G, and B channels to 128, and S*3 is the first line width.

Figure 9:
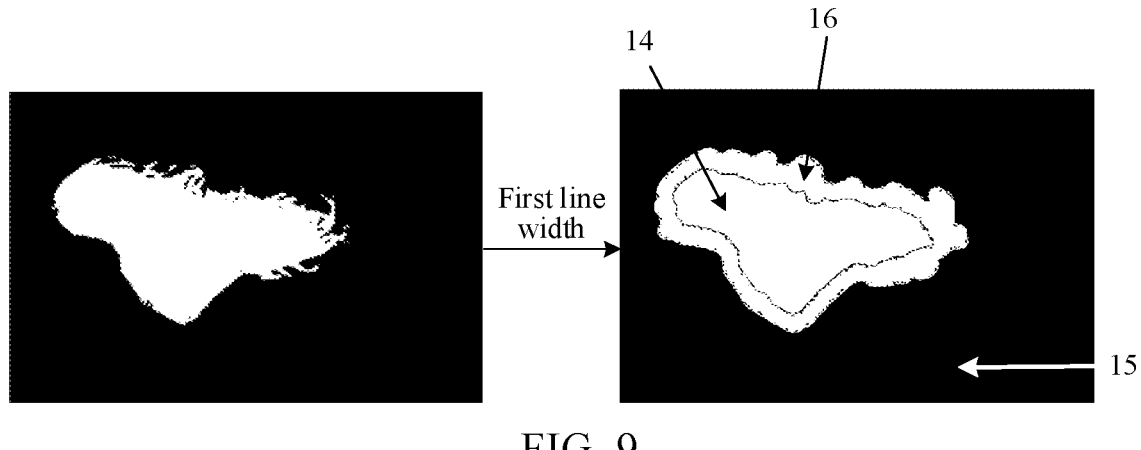
FIG. 9 is a schematic diagram of a third trimap according to an example embodiment of the disclosure.

FIG. 9 is a schematic diagram of a third trimap according to an example embodiment. A left diagram of FIG. 9 is the second image, and a right diagram of FIG. 9 is the third trimap. The third trimap includes a foreground region 14, a background region 15, and a fourth line drawing sub-region 16. The fourth line drawing sub-region 16 is drawn according to the first line width.

5045. Combine the second trimap and the third trimap, to obtain the first trimap.

The combining the second trimap and the third trimap means using a maximum identifier value at the same position in the two trimaps as an identifier value at a corresponding position in the first trimap.

The following describes in detail a specific implementation of this operation, including the following operation A to operation C:

Operation A: Obtain a first identifier value of each pixel in the second trimap, the first identifier value being used for identifying a color of the pixel in the second trimap.

Operation B: Obtain a second identifier value of each pixel in the third trimap, the second identifier value being used for identifying a color of the pixel in the third trimap.

Operation C: Generate the first trimap based on a magnitude relationship between the first identifier value and the second identifier value.

An implementation of operation C includes: comparing a first identifier value of a pixel at any position in the second trimap with a second identifier value of a pixel at the same position in the third trimap; and using a maximum of the first identifier value and the second identifier value as a third identifier value of a pixel at the same position in the first trimap, the third identifier value being used for identifying a color of the pixel in the first trimap.

In an example, still referring to FIG. 7, after obtaining the second trimap and the third trimap, the terminal combines the two trimaps by using the following formula (4), to obtain the first trimap. The formula (4) is as follows:

$$Pixel_{result}=Pixel_{leftUp}>Pixel_{leftDown}?Pixel_{leftUp}:Pix- \\ el_{leftDown} \qquad (4)$$

In the formula, $Pixel_{result}$ is the first trimap, that is, the right diagram of FIG. 7, $Pixel_{leftUp}$ is the second trimap, that is, an upper left diagram of FIG. 7, and $Pixel_{leftDown}$ is the third trimap, that is, a lower left diagram of FIG. 7.

As shown in the right diagram of FIG. 7, in the first trimap generated in operation 5045, the first line drawing sub-region 9 corresponding to the hair region is greater than the second line drawing sub-region 10 corresponding to another region. In this manner in which different line drawing regions are obtained through drawing according to different line widths, during subsequent image matting processing, image matting precision may be improved for a complex image matting region such as the hair region, to improve an image matting effect for the region.

505. Generate a target trimap based on the third image and the first trimap.

In some embodiments of the disclosure, the target trimap includes the foreground region and a line drawing region, and the line drawing region is obtained by drawing a line on a contour line of the foreground region. Different sub-regions of the foreground region correspond to different line widths. In some embodiments, the foreground region further includes a torso region of the target object, in the target trimap, a line width corresponding to the hair region being greater than a line width corresponding to the torso region, and the line width corresponding to the torso region being greater than a line width corresponding to the face region.

Figure 10:
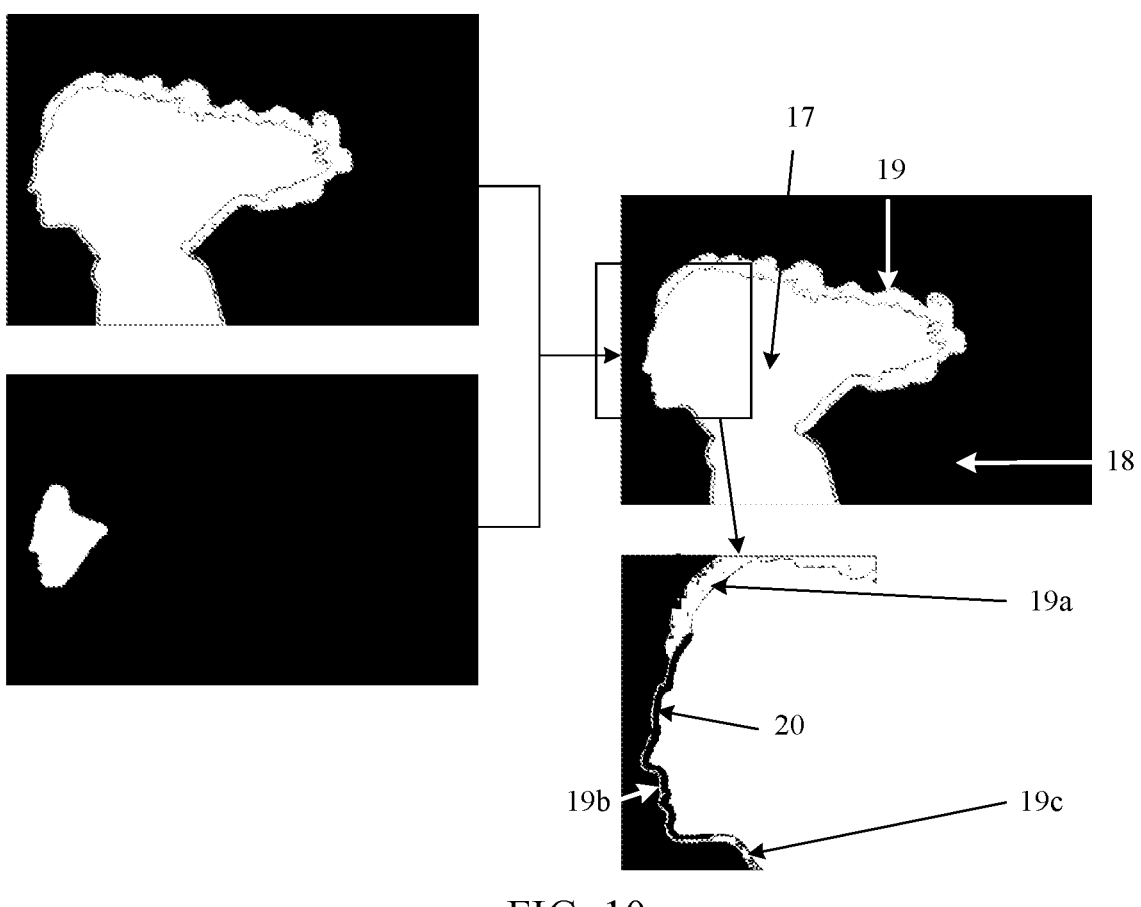
FIG. 10 is a schematic diagram of a target trimap according to an example embodiment of the disclosure.

FIG. 10 is a schematic diagram of a target trimap according to an example embodiment. An upper right diagram of FIG. 10 is the target trimap. The map includes a foreground region 17, a background region 18, and a line drawing region 19. In the line drawing region 19, a line width corresponding to the hair region is greater than a line width corresponding to the torso region, and the line width corresponding to the torso region is greater than a line width corresponding to the face region. In an example, for a relationship between line widths in the line drawing region 19, further refer to a lower right diagram of FIG. 10. The diagram includes line drawing regions 19*a*, 19*b*, and 19*c*. In the diagram, 19*a* represents the line width corresponding to the hair region, 19*b* represents the line width corresponding to the face region, and 19*c* represents the line width corresponding to the torso region. As shown in the diagram, the line width 19*a* corresponding to the hair region is greater than the line width 19*c* corresponding to the torso region, and the line width 19*c* corresponding to the torso region is greater than the line width 19*b* corresponding to the face region.

The following describes in detail a specific implementation of generating the target trimap by the terminal in this operation, including the following operation 5051 and operation 5052:

5051. Determine a target overlap region of the first trimap based on the face region in the third image, the target overlap region being an overlap region between the face region and the second line drawing sub-region.

After obtaining the first trimap, the terminal determines the target overlap region in the first trimap based on a pixel position of the face region in the third image. In an example, still referring to FIG. 10, as shown in the lower right diagram of FIG. 10, the diagram includes a target overlap region 20. The region is an overlap region between the face region in the third image and the second line drawing sub-region 19 in the first trimap.

5052. Assign a target identifier value to a pixel in the target overlap region, to generate the target trimap, the target identifier value being used for identifying a color of a pixel in the face region.

In the first trimap, an identifier value of the target overlap region is the identifier value of the second line drawing sub-region. In this operation, the identifier value of the target overlap region in the first trimap is changed by assigning the target identifier value to the pixel in the region, to generate the target trimap. In an example, the identifier value of the face region is 255, the identifier value of the second line drawing sub-region is 128, and in the first trimap, the identifier value of the target overlap region is originally 128. In this operation 5052, the pixel of the target overlap region is reassigned the identifier value 255, to obtain the target trimap.

In some embodiments, operation 5051 and operation 5052 may be implemented by using the following formula (5):

$$Pixel=Pixel \in \phi\{Face\}?255:Pixel_{trimp} \qquad (5)$$

In the formula, $\phi\{Face\}$ represents the face region, 255 represents the target identifier value, and $Pixel_{trimp}$ is the target trimap. In the formula (5), the target identifier value is assigned to a pixel in the first trimap that belongs to the face region, so that the face region does not participate in the following operation 506 and operation 507, that is, a process of computing transparency by using an image matting model.

Through operation 501 to operation 505, after the terminal obtains the original image, the target trimap is automatically generated, and in the target trimap, different subregions of the foreground region correspond to different line widths.

In actual application, a label of a foreground-background mixed region in a trimap directly affects precision of an image matting effect, and in the trimap, if the foreground region is labeled as a foreground-background mixed region, an inaccurate image matting result is caused.

However, in some embodiments of the disclosure, the line drawing region in the target trimap is a foreground-background mixed region, and when the terminal automatically generates the target trimap, lines are drawn for the hair region and another region other than the hair region according to different line widths, thereby ensuring an image matting range of a complex region such as the hair region, and improving image matting precision of the region. In addition, the target identifier value that is the same as the identifier value of the foreground region is assigned to the pixel belonging to the face region, which allows for protection for a key region in a character portrait, and avoids a detail loss during image matting.

506. Input the target trimap and the original image to an image matting model.

In some embodiments of the disclosure, the image matting model is configured to compute, according to the inputted target trimap and original image, a probability of each pixel in the original image belonging to a target image, to output transparency. In some embodiments, the transparency may be computed by using the following formula (6):

$$I=\alpha *F+(1-\alpha)*B \qquad (6)$$

In the formula, I represents the original image, F represents foreground, that is, the region including all the elements of the target object, B represents background, and $\alpha$ is transparency, and is used for indicating a proportion of a foreground color in the original image. The formula (6) indicates that the original image is obtained by overlaying the foreground and the background according to specific transparency.

In some embodiments, the image matting model may be an IndexNet image matting model, a GCAMatting image matting model, a ContextNet model, or the like. A specific type of the image matting model is not limited in some embodiments of the disclosure.

Figure 11:
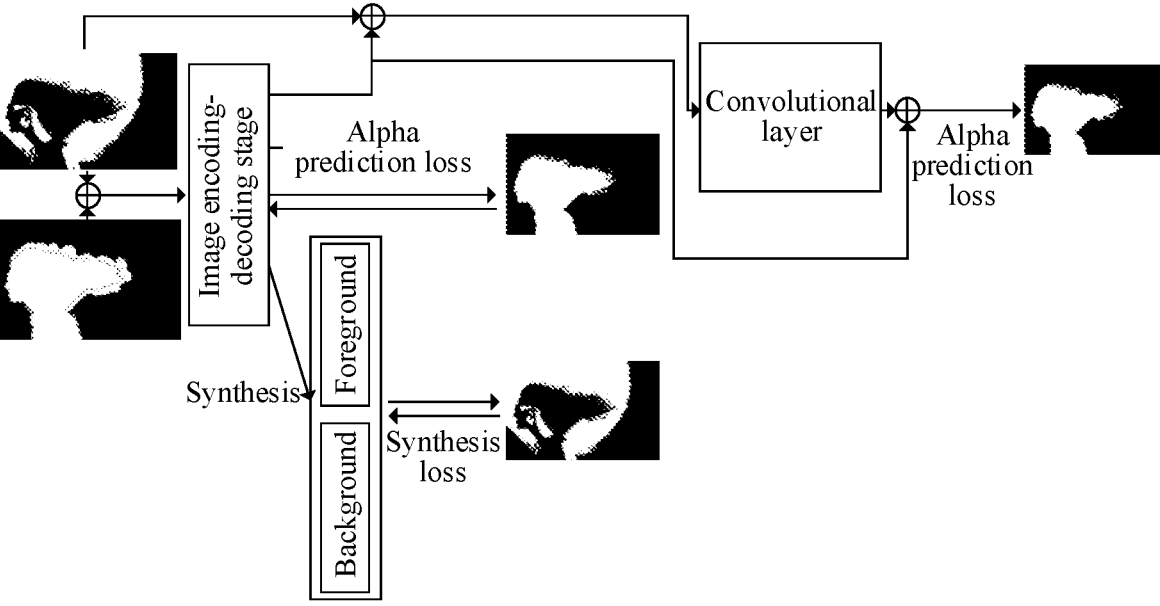
FIG. 11 is a schematic diagram of an image matting model according to an example embodiment of the disclosure.

This operation is illustrated by using the IndexNet image matting model as an example. In an example, FIG. 11 is a schematic diagram of an image matting model according to an example embodiment of the disclosure. As shown in FIG. 11, the target trimap and the original image are used as an input, to obtain a rough Alpha ($\alpha$) map and an Alpha prediction loss. In addition, rough foreground and background are synthesized and then compared with the original image, to obtain an image synthesis loss. Finally, a fine Alpha map, that is, an Alpha value of each pixel, is obtained through optimization by using a convolutional layer, and a fine image matting result is outputted.

507. Obtain the transparency outputted by the image matting model, the transparency being used for representing a probability of a pixel belonging to the target object.

508. Perform image matting processing on the original image based on the transparency, to obtain a target image including the target object.

Figure 12:
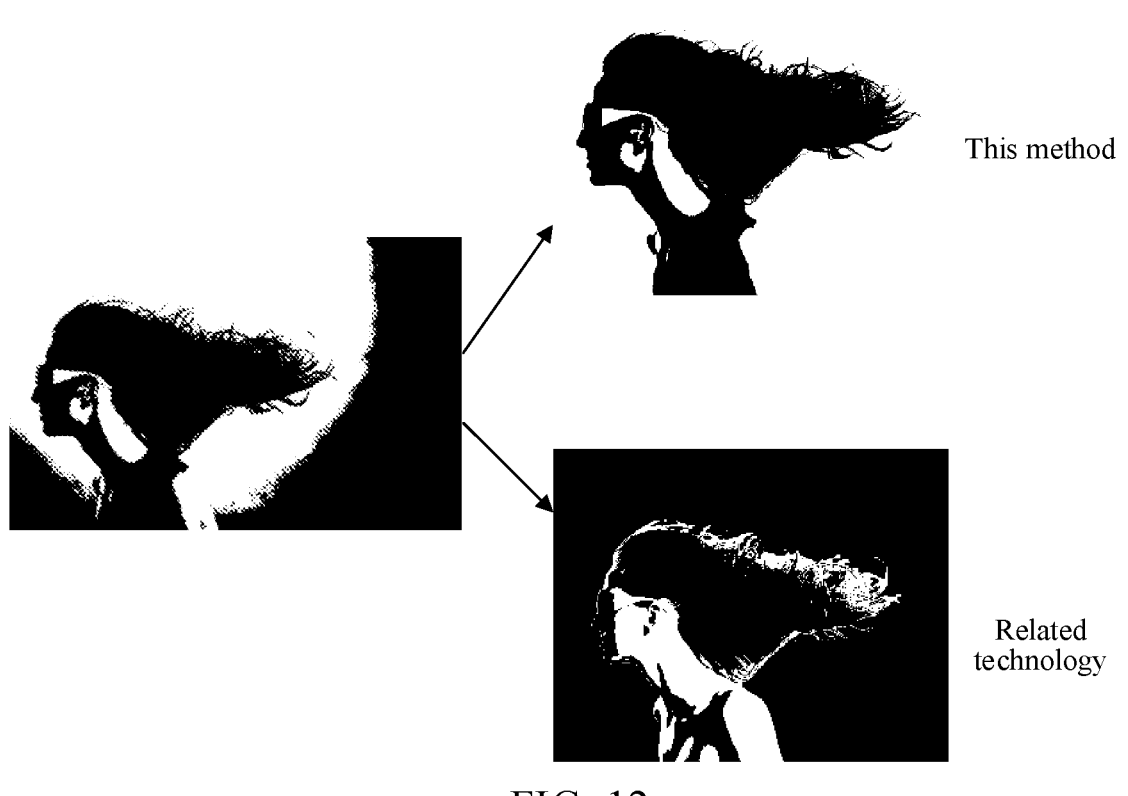
FIG. 12 is a schematic diagram of a target image according to an example embodiment of the disclosure.

In some embodiments of the disclosure, the image matting processing in this operation 508 is a process of separating the target object in the original image from the background based on transparency of each pixel, to obtain a target image. In an example, FIG. 12 is a schematic diagram of a target object according to an example embodiment of the disclosure. A left diagram of FIG. 12 shows the original image, and an upper right diagram of FIG. 12 shows the target image obtained according to this method. In the diagram, the character portrait has a natural hair end, image matting is fine, and the face is complete. A lower right diagram of FIG. 12 shows a target image obtained according to an image segmentation method in the related art. In the diagram, although image segmentation is accurate, the character portrait has a rough hair end, and the face has a detail loss.

In some embodiments of the disclosure, during image matting on an original image, a plurality of segmented images including different regions are first obtained through semantic segmentation. Further, according to the segmented images, lines of different widths are drawn on a contour line of a foreground region to obtain a target trimap. Finally, a target image is generated based on the target trimap. For the target trimap, because lines of different widths are drawn on the contour line of the foreground region, pertinent image matting may be implemented for different regions, so that image matting precision may be improved for a region requiring fine image matting, and image matting precision of another region can also be ensured. In this way, a final image obtained through image matting is fine and natural. In addition, the image matting process is fully automated, which greatly improves image matting efficiency.

Figure 13:
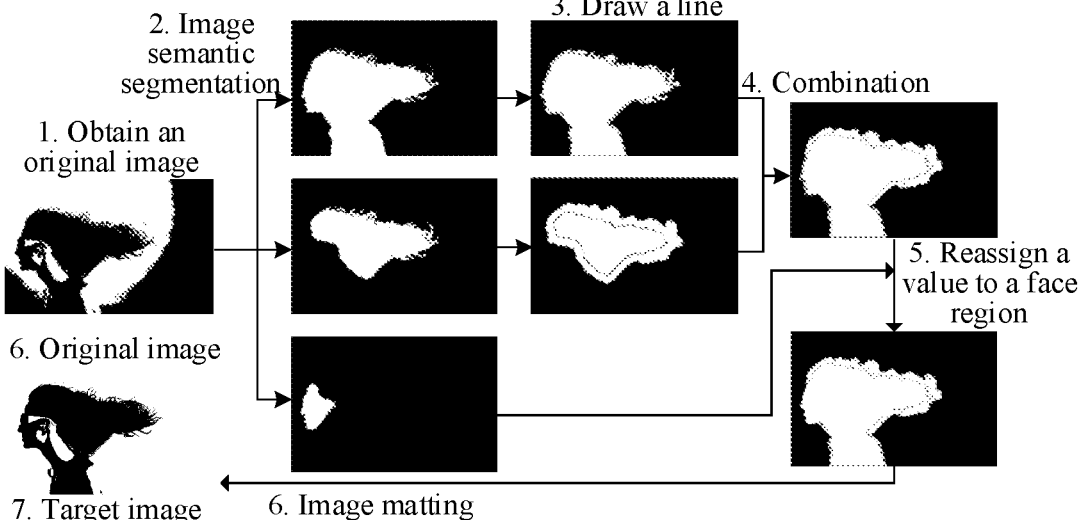
FIG. 13 is a schematic diagram of an image processing method according to an example embodiment of the disclosure.

The following briefly summarizes, with reference to FIG. 13, the image processing method provided in the embodiments of the disclosure. As shown in FIG. 13, the method includes the following six image processing stages:

First, an original image is obtained, the original image being an image including a character portrait.

Second, image semantic segmentation is performed on the original image based on an HRNET-OCR model, and three segmented images are obtained according to a segmentation result. A first segmented image includes a foreground region, and the foreground region includes all elements of the character portrait. The second segmented image includes a hair region. A boundary line between a human torso and background is obvious, while hair is often seriously merged with the background due to characteristics of its shape, and usually requires more efforts during image matting. A third segmented image includes a face region, and may also be understood as a protected region. The face is an important part of the character portrait, and mistaken image matting greatly affects look and feel. Therefore, the region needs to be protected from mistaken image matting.

Third, for the first segmented image, a line is drawn on a contour line of the foreground region based on a basic size, to obtain a second trimap. For the second segmented image, a line is drawn on a contour line of the hair region based on three times the basic size, to obtain a third trimap. An identifier value of the drawn lines is 128.

Fourth, the second trimap and the third trimap are combined, to obtain a combined first trimap.

Fifth, the face region in the first trimap is reset with a foreground label, that is, each pixel of the face region in the first trimap is reassigned 255, to obtain a target trimap.

Sixth, a target image, that is, the character portrait in the original image, is finally obtained based on the target trimap.

For the target trimap, because lines of different widths are drawn on the contour line of the foreground region, pertinent image matting may be implemented for different regions, so that image matting precision may be improved for a region requiring fine image matting, and image matting precision of another region can also be ensured. In this way, a final image obtained through image matting is fine and natural. In addition, the image matting process is fully automated, which greatly improves image matting efficiency.

In an example, application scenarios of the image processing method provided in the embodiments of the disclosure include but are not limited to the following:

Scenario 1: Image Macro Scenario

With popularity of image macro culture, a function of making an image macro is added to many applications, making it convenient for users to express their emotions and moods by making image macros. In some scenarios, a user expects to extract a character portrait in a picture, and then adds a sticker, a text, background, or the like based on the character portrait, to make an image macro the user wants.

In an example, a terminal provides, through an application, a function of making an image macro based on a character portrait, and the user performs an operation on the terminal to input an original image from which a character portrait is to be extracted. After obtaining the original image, the terminal automatically extracts the character portrait in the original image by using the image processing method provided in the embodiments of the disclosure, and displays the character portrait on the terminal, so that the user subsequently performs another image processing operation based on the character portrait, to obtain an image macro the user wants. In an example, a process in which the terminal extracts the character portrait includes the following operation 1 to operation 8:

1. The terminal obtains the original image.
2. The terminal inputs the original image to an image segmentation model.
3. The terminal obtains a first image, a second image, and a third image that are outputted by the image segmentation model. The first image includes a foreground region in which the character portrait in the original image is located, the second image includes a hair region of the character portrait, and the third image includes a face region of the character portrait.
4. The terminal generates a first trimap based on the first image and the second image, the first trimap including the foreground region, a first line drawing sub-region, and a second line drawing sub-region.
5. The terminal generates a target trimap based on the third image and the first trimap.
6. The terminal inputs the target trimap and the original image to an image matting model.
7. The terminal obtains transparency outputted by the image matting model, the transparency being used for representing a probability of a pixel belonging to the character portrait.
8. The terminal performs image matting processing on the original image based on the transparency, to obtain a target image including the character portrait. Subsequently, the user makes an image macro based on the target image.

According to the image processing method provided in the embodiments of the disclosure, a character portrait may be automatically extracted, and the extracted character portrait has a fine and natural effect, and may meet personalized requirements of users for making image macros.

Scenario 2: Live Streaming Scenario

In some live streaming scenarios, to protect personal privacy, an anchor expects to hide a real background environment in which the anchor is located, and display only a character portrait of the anchor in a live streaming screen, or add other virtual background based on the character portrait of the anchor.

In an example, a terminal provides a character portrait mode during live streaming, and the anchor enables the character portrait mode, so that the terminal obtains each frame of an original image captured by a camera in real time, and then extracts the character portrait of the anchor from each frame of the original image by using the image processing method provided in the embodiments of the disclosure, and generates a live streaming screen in real time for live streaming. A specific process of extracting the character portrait by the terminal is similar to that in the foregoing scenario, and therefore, details are not described herein again.

It can be learned that, the image processing method provided in the embodiments of the disclosure automatically extracts a character portrait, and therefore may be directly applied to such scenarios in which a character portrait needs to be extracted in real time.

It is to be understood that, although the operations are displayed sequentially according to the instructions of the arrows in the flowcharts of the embodiments, these operations are not necessarily performed sequentially according to the sequence instructed by the arrows. Unless otherwise clearly specified in this specification, the operations are performed without any strict sequence limit, and may be performed in other sequences. In addition, at least some operations in the flowcharts of the foregoing embodiments may include a plurality of operations or a plurality of stages. The operations or the stages are not necessarily performed at the same moment, but may be performed at different moments. The operations are not necessarily performed in sequence, but may be performed in turn or alternately with another operation or at least some operations of the another operation.

Figure 14:
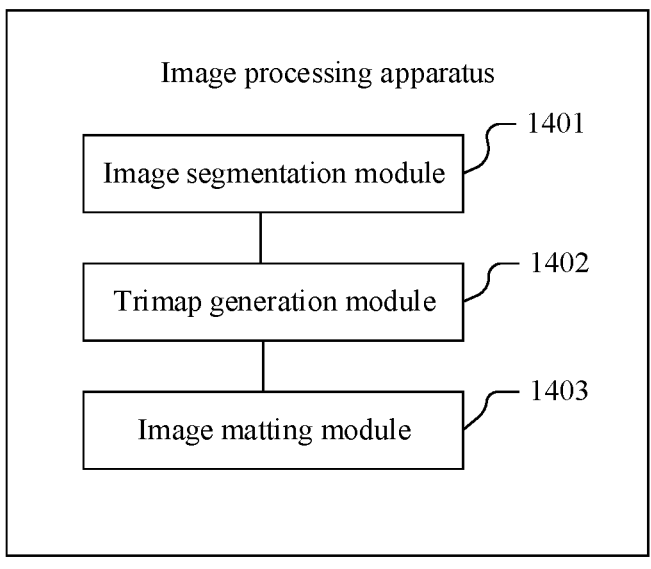
FIG. 14 is a schematic structural diagram of an image processing apparatus according to an example embodiment of the disclosure.

FIG. 14 is a schematic structural diagram of an image processing apparatus according to an example embodiment of the disclosure. The apparatus is configured to perform operations of the image processing method. Referring to FIG. 14, the apparatus includes: an image segmentation module 1401, a trimap generation module 1402, and an image matting module 1403.

The image segmentation module 1401 is configured to perform image semantic segmentation on an original image, to obtain a first image, a second image, and a third image, the first image including a foreground region in which a target object in the original image is located, the second image including a hair region of the target object, and the third image including a face region of the target object.

The trimap generation module 1402 is configured to generate a target trimap based on the first image, the second image, and the third image, the target trimap including the foreground region and a line drawing region, and the line drawing region being obtained by drawing a line on a contour line of the foreground region; and different sub-regions of the foreground region being corresponding to different line widths.

The image matting module 1403 is configured to perform image matting processing on the original image based on the target trimap, to obtain a target image including the target object.

In some embodiments, the foreground region further includes a torso region of the target object, in the target trimap, a line width corresponding to the hair region being greater than a line width corresponding to the torso region, and the line width corresponding to the torso region being greater than a line width corresponding to the face region.

In some embodiments, the trimap generation module 1402 includes:
a first generation unit, configured to generate a first trimap based on the first image and the second image, the first trimap including the foreground region, a first line drawing sub-region, and a second line drawing sub-region;
the first line drawing sub-region covering a contour line on a side of the hair region that is close to a background region, the second line drawing sub-region covering a contour line of another region, and the another region being a region in the foreground region other than the hair region; a first line width being greater than a second line width; and the first line width being used for drawing the first line drawing sub-region, and the second line width being used for drawing the second line drawing sub-region; and
a second generation unit, configured to generate the target trimap based on the third image and the first trimap.

In some embodiments, the first generation unit is configured to: obtain a complete contour line of the foreground region in the first image; draw a line on the complete contour line of the foreground region based on the second line width, to obtain a second trimap, the second trimap including the foreground region and a third line drawing sub-region, and the third line drawing sub-region covering the complete contour line of the foreground region; obtain a complete contour line of the hair region in the second image; draw a line on the complete contour line of the hair region based on the first line width, to obtain a third trimap, the third trimap including the hair region and a fourth line drawing sub-region, and the fourth line drawing sub-region covering the complete contour line of the hair region; and combine the second trimap and the third trimap, to obtain the first trimap.

In some embodiments, the first line width is M times the second line width, M being greater than 1.

In some embodiments, the first generation unit is further configured to: obtain a first identifier value of each pixel in the second trimap, the first identifier value being used for identifying a color of the pixel in the second trimap; obtain a second identifier value of each pixel in the third trimap, the second identifier value being used for identifying a color of the pixel in the third trimap; and generate the first trimap based on a magnitude relationship between the first identifier value and the second identifier value.

In some embodiments, the first generation unit is further configured to: compare a first identifier value of a pixel at any position in the second trimap with a second identifier value of a pixel at the same position in the third trimap; and use a maximum of the first identifier value and the second identifier value as a third identifier value of a pixel at the same position in the first trimap, the third identifier value being used for identifying a color of the pixel in the first trimap.

In some embodiments, the second generation unit is configured to: determine a target overlap region of the first trimap based on the face region in the third image, the target overlap region being an overlap region between the face region and the second line drawing sub-region; and assign a target identifier value to a pixel in the target overlap region, to generate the target trimap, the target identifier value being used for identifying a color of a pixel in the face region.

In some embodiments, the image matting module 1403 is configured to: obtain transparency of each pixel in the original image based on the target trimap, the transparency being used for representing a probability of the pixel belonging to the target object; and perform image matting processing on the original image based on the transparency, to obtain the target image.

In some embodiments, the image matting module 1401 is further configured to: obtain the original image; input the original image to an image segmentation model, the image segmentation model being configured to compute, according to the inputted original image, a semantic category of each pixel in the original image, to output at least one image of the original image; and obtain the first image, the second image, and the third image that are outputted by the image segmentation model.

In some embodiments, the image matting module 1403 is further configured to: input the target trimap and the original image to an image matting model, the image matting model being configured to compute, according to the inputted target trimap and original image, a probability of each pixel in the original image belonging to the target image, to output the transparency; and obtain the transparency outputted by the image matting model.

In some embodiments of the disclosure, during image matting on an original image, a plurality of segmented images including different regions are first obtained through semantic segmentation. Further, according to the segmented images, lines of different widths are drawn on a contour line of a foreground region to obtain a target trimap. Finally, a target image is generated based on the target trimap. For the target trimap, because lines of different widths are drawn on the contour line of the foreground region, pertinent image matting may be implemented for different regions, so that image matting precision may be improved for a region requiring fine image matting, and image matting precision of another region can also be ensured. In this way, a final image obtained through image matting is fine and natural. In addition, the image matting process is fully automated, which greatly improves image matting efficiency.

The division of the foregoing functional modules is merely used as an example for description when the image processing apparatus provided in the foregoing embodiments performs image processing. In practical application, the foregoing functions may be allocated to and completed by different functional modules as required, that is, an inner structure of the apparatus is divided into different functional modules to implement all or a part of the functions described above. The modules in the foregoing apparatus may be implemented entirely or partially by software, hardware, or a combination thereof. The foregoing modules may be built in or independent of a processor of a computer device in a hardware form, or may be stored in a memory of a computer device in a software form, so that the processor invokes and performs an operation corresponding to each of the foregoing modules. In addition, the image processing apparatus provided in the foregoing embodiment belongs to the same idea as the image processing method. See the method embodiment for a specific implementation process thereof, and the details are not described herein again.

Figure 15:
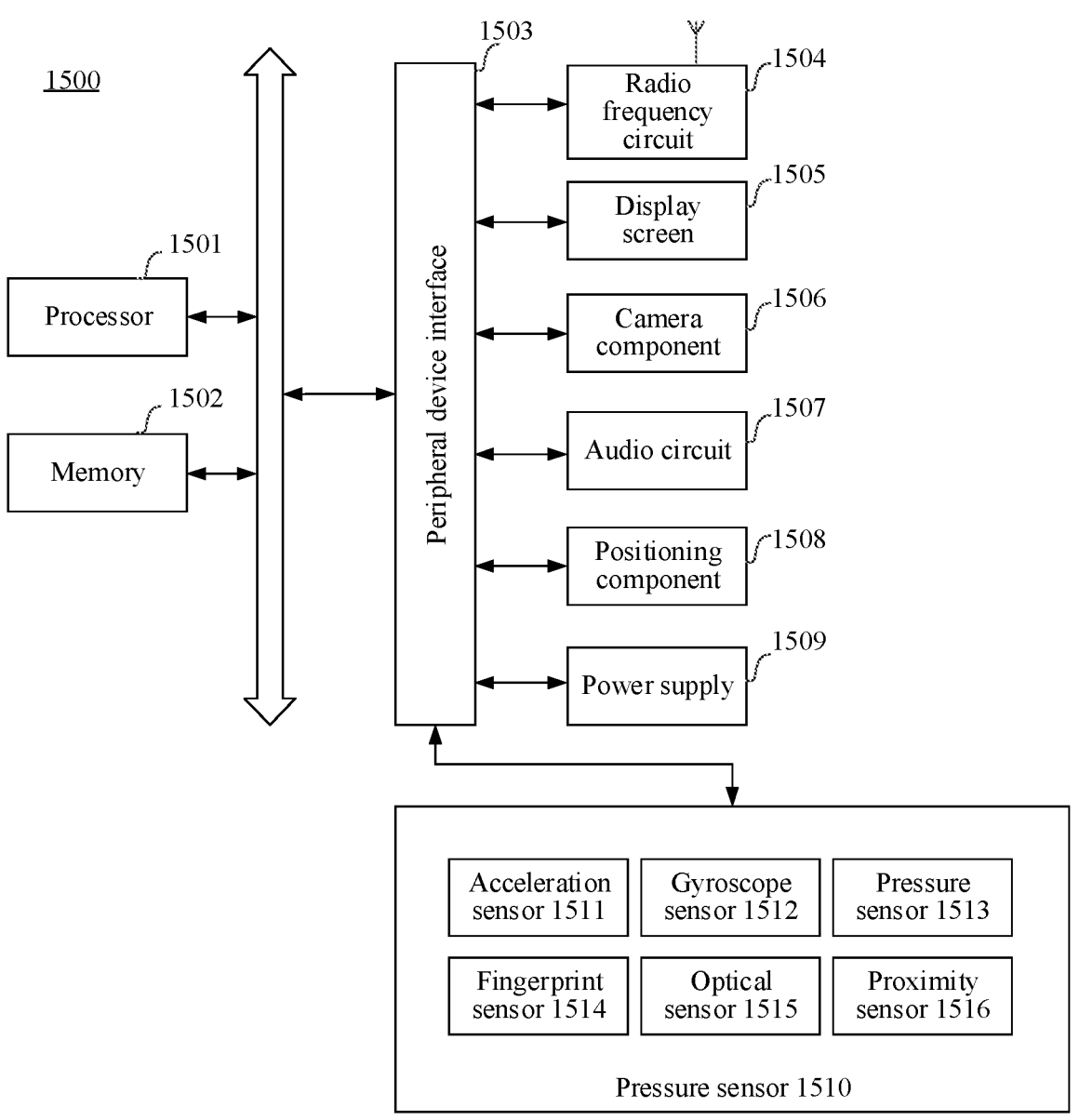
FIG. 15 is a schematic structural diagram of a terminal according to an example embodiment of the disclosure.

In an exemplary embodiment, a computer device is further provided. In an example, the computer device is a terminal. FIG. 15 is a schematic structural diagram of a terminal 1500 according to an exemplary embodiment of the disclosure. The terminal 1500 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1500 may also be referred to as another name such as user equipment, a portable terminal, a laptop terminal, or a desktop terminal.

Generally, the terminal 1500 includes: one or more processors 1501 and a memory 1502.

The processor 1501 may include one or more processing cores, and may be, for example, a 4-core processor or an 8-core processor. The processor 1501 may be implemented in at least one hardware form of a digital signal processor (DSP), a field-programmable gate array (FPGA), and a programmable logic array (PLA). The processor 1501 may also include a main processor and a coprocessor. The main processor is a processor configured to process data in an active state, also referred to as a central processing unit (CPU); and the coprocessor is a low-power processor configured to process data in a standby state. In some embodiments, the processor 1501 may be integrated with a graphics processing unit (GPU). The GPU is configured to render and draw content that needs to be displayed on a display. In some embodiments, the processor 1501 may further include an A1 processor. The A1 processor is configured to process a computing operation related to machine learning.

The memory 1502 may include one or more computer-readable storage media that may be non-transient. The memory 1502 may further include a high-speed random access memory and a non-volatile memory, for example, one or more disk storage devices or flash storage devices. In some embodiments, the non-transient computer-readable storage medium in the memory 1502 is configured to store at least one computer-readable instruction, and the at least one computer-readable instruction is configured to be executed by the one or more processors 1501 to implement the image processing method provided in the method embodiments of the disclosure.

In some embodiments, the terminal 1500 may further include: a peripheral device interface 1503 and at least one peripheral device. The one or more processors 1501, the memory 1502, and the peripheral device interface 1503 may be connected by a bus or a signal line. Each peripheral device may be connected to the peripheral device interface 1503 through a bus, a signal cable, or a circuit board. Specifically, the peripheral device includes: at least one of a radio frequency circuit 1504, a display screen 1505, a camera component 1506, an audio circuit 1507, a positioning component 1508, and a power supply 1509.

The peripheral device interface 1503 may be configured to connect at least one peripheral device related to input/output (I/O) to the one or more processors 1501 and the memory 1502.

The radio frequency circuit 1504 is configured to receive and transmit a radio frequency (RF) signal that is also referred to as an electromagnetic signal. The RF circuit 1504 communicates with a communication network and other communication devices through the electromagnetic signal.

The display screen 1505 is configured to display a user interface (UI). The UI may include graphics, text, icons, videos, and any combination thereof. When the display screen 1505 is a touch display screen, the display screen 1505 is further capable of collecting touch signals on or above a surface of the display screen 1505. The touch signal may be inputted to the one or more processors 1501 as a control signal for processing. In this case, the display screen 1505 may be further configured to provide a virtual button and/or a virtual keyboard that are/is also referred to as a soft button and/or a soft keyboard. In some embodiments, there may be one display screen 1505, disposed on a front panel of the terminal 1500. In some other embodiments, there may be at least two display screens 1505 that are respectively disposed on different surfaces of the terminal 1500 or in a folded design. In some other embodiments, the display screen 1505 may be a flexible display screen, disposed on a curved surface or a folded surface of the terminal 1500. The display screen 1505 may further be set to have a non-rectangular irregular graph, that is, a special-shaped screen.

The display screen 1505 may be made of materials such as a liquid crystal display (LCD), an organic light-emitting diode (OLED), and the like.

The camera component 1506 is configured to collect images or videos.

The audio circuit 1507 may include a microphone and a speaker. The microphone is configured to collect sound waves of a user and an environment, and convert the sound waves into an electrical signal to input to the one or more processors 1501 for processing, or input to the radio frequency circuit 1504 for implementing voice communication. The speaker is configured to convert electrical signals from the one or more processors 1501 or the RF circuit 1504 into sound waves.

The positioning component 1508 is configured to determine a current geographic location of the terminal 1500, to implement navigation or a location-based service (LBS).

The power supply 1509 is configured to supply power to components in the terminal 1500.

In some embodiments, the terminal 1500 further includes one or more sensors 1510. The one or more sensors 1510 include but are not limited to an acceleration sensor 1511, a gyroscope sensor 1512, a pressure sensor 1513, a fingerprint sensor 1514, an optical sensor 1515, and a proximity sensor 1516.

The acceleration sensor 1511 may detect a magnitude of acceleration on three coordinate axes of a coordinate system established by the terminal 1500.

The gyroscope sensor 1512 may detect a body direction and a rotation angle of the terminal 1500, and the gyroscope sensor 1512 may work with the acceleration sensor 1511 to collect a 3D action performed by the user on the terminal 1500.

The pressure sensor 1513 may be disposed on a side frame of the terminal 1500 and/or a lower layer of the display screen 1505.

The fingerprint sensor 1514 is configured to collect a user's fingerprint, and the one or more processors 1501 identify a user's identity according to the fingerprint collected by the fingerprint sensor 1514, or the fingerprint sensor 1514 identifies a user's identity according to the collected fingerprint.

The optical sensor 1515 is configured to collect ambient light intensity. In an example embodiment, the one or more processors 1501 may control the display brightness of the display screen 1505 according to the ambient light intensity collected by the optical sensor 1515.

The proximity sensor 1516, also referred to as a distance sensor, is generally disposed on the front panel of the terminal 1500. The proximity sensor 1516 is configured to collect a distance between the user and the front surface of the terminal 1500.

A person skilled in the art may understand that the structure shown in FIG. 15 constitutes no limitation on the terminal 1500, and the terminal may include more or fewer components than those shown in the figure, or some components may be combined, or a different component deployment may be used.

An example embodiment of the disclosure further provides one or more computer-readable storage media, applicable to a computer device and storing at least one computer-readable instruction, the at least one computer-readable instruction being loaded and executed by one or more processors to implement the operations performed in the image processing method in the foregoing embodiments.

An example embodiment of the disclosure further provides a computer program product or a computer program, the computer program product or the computer program including computer-readable instructions, and the computer-readable instructions being stored in a computer-readable storage medium. One or more processors of a computer device read the computer-readable instructions from the computer-readable storage medium and execute the computer-readable instructions, to cause the computer device to perform the image processing method provided in the foregoing various optional implementations.

A person of ordinary skill in the art may understand that all or part of the operations of implementing the foregoing embodiments may be implemented by hardware, or may be implemented by a program instructing related hardware. The program may be stored in a computer-readable storage medium. The storage medium mentioned may be a read-only memory, a magnetic disk, or an optical disc.

The foregoing descriptions are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. An image processing method, performed by a computer device, the method comprising:
   performing image semantic segmentation on an original image, to obtain a first image, a second image, and a third image, a foreground region in the first image being a region in which a target object in the original image is located, the second image being a segmented image of a first target region of the target object, and the third image being a segmented image of a second target region of the target object, and, of the first image, sub-regions of the foreground region comprising the first target region and the second target region;
   generating a target trimap based on the first image, the second image, and the third image, the target trimap comprising the foreground region and a line drawing region, and the line drawing region being obtained by drawing lines on contours of the foreground region, and different sub-regions of the foreground region being corresponding to different line widths of the lines, and generating the target trimap is further based on the different line widths; and
   performing image matting processing on the target object in the original image based on the target trimap, to obtain a target image comprising the target object.

2. The method according to claim 1, wherein the first target region is a hair region, the second target region is a face region, and the foreground region further comprises a torso region of the target object, in the target trimap, a line width corresponding to the hair region being greater than a line width corresponding to the torso region, and the line width corresponding to the torso region being greater than a line width corresponding to the face region.

3. The method according to claim 1, wherein the first target region is a hair region, the second target region is a face region, and the generating comprises:
   generating a first trimap based on the first image and the second image, the first trimap comprising the foreground region, a first line drawing sub-region, and a second line drawing sub-region;
   the first line drawing sub-region covering a contour line on a side of the hair region that is close to a background region in the first image, the second line drawing sub-region covering a contour line of a non-hair region in the foreground region, and the non-hair region being a region in the foreground region other than the hair region, the first line drawing sub-region being drawn by using a first line width, and the second line drawing sub-region being drawn by using a second line width, and the first line width being greater than the second line width; and generating the target trimap based on the third image and the first trimap.

4. The method according to claim 3, wherein the generating a first trimap based on the first image and the second image comprises:

obtaining a complete contour line of the foreground region in the first image;

drawing a line on the complete contour line of the foreground region based on the second line width, to obtain a second trimap, the second trimap comprising the foreground region and a third line drawing sub-region, and the third line drawing sub-region covering the complete contour line of the foreground region;

obtaining a complete contour line of the hair region in the second image;

drawing a line on the complete contour line of the hair region based on the first line width, to obtain a third trimap, the third trimap comprising the hair region and a fourth line drawing sub-region, and the fourth line drawing sub-region covering the complete contour line of the hair region; and combining the second trimap and the third trimap, to obtain the first trimap.

5. The method according to claim 3, wherein the first line width is M times the second line width, M being greater than 1.

6. The method according to claim 4, wherein the combining comprises:

obtaining a first identifier value of each pixel in the second trimap, the first identifier value being used for identifying a color of the pixel in the second trimap;

obtaining a second identifier value of each pixel in the third trimap, the second identifier value being used for identifying a color of the pixel in the third trimap; and generating the first trimap based on a magnitude relationship between the first identifier value and the second identifier value.

7. The method according to claim 6, wherein the generating the first trimap based on a magnitude relationship between the first identifier value and the second identifier value comprises:

comparing a first identifier value of a pixel at any position in the second trimap with a second identifier value of a pixel at the same position in the third trimap; and using a maximum of the first identifier value and the second identifier value as a third identifier value of a pixel at the same position in the first trimap, the third identifier value being used for identifying a color of the pixel in the first trimap.

8. The method according to claim 3, wherein the generating the target trimap based on the third image and the first trimap comprises:

determining a target overlap region of the first trimap based on the face region in the third image, the target overlap region being an overlap region between the face region and the second line drawing sub-region; and assigning a target identifier value to a pixel in the target overlap region, to generate the target trimap, the target identifier value being used for identifying a color of a pixel in the face region.

9. The method according to claim 1, wherein the performing image matting processing comprises:

obtaining transparency of each pixel in the original image based on the target trimap, the transparency being used for representing a probability of the pixel belonging to the target object; and performing image matting processing on the original image based on the transparency, to obtain the target image.

10. The method according to claim 9, wherein the obtaining transparency comprises:

inputting the target trimap and the original image to an image matting model, to compute, according to the target trimap and the original image based on the image matting model, a probability of each pixel in the original image belonging to the target image, to output the transparency; and obtaining the transparency outputted by the image matting model.

11. An image processing apparatus, the apparatus comprising:

at least one memory configured to store program code; and at least one processor configured to read the program code and operate as instructed by the program code, the program code comprising:

image segmentation code, configured to cause the at least one processor to perform image semantic segmentation on an original image, to obtain a first image, a second image, and a third image, a foreground region in the first image being a region in which a target object in the original image is located, the second image being a segmented image of a first target region of the target object, and the third image being a segmented image of a second target region of the target object, and, of the first image, sub-regions of the foreground region comprising the first target region and the second target region;

trimap generation code, configured to cause the at least one processor to generate a target trimap based on the first image, the second image, and the third image, the target trimap comprising the foreground region and a line drawing region, and the line drawing region being obtained by drawing lines on contours of the foreground region, and different sub-regions of the foreground region being corresponding to different line widths of the lines, and generating the target trimap is further based on the different line widths; and image matting code, configured to cause the at least one processor to perform image matting processing on the target object in the original image based on the target trimap, to obtain a target image comprising the target object.

12. The apparatus according to claim 11, wherein the first target region is a hair region, the second target region is a face region, and the foreground region further comprises a torso region of the target object, in the target trimap, a line width corresponding to the hair region being greater than a line width corresponding to the torso region, and the line width corresponding to the torso region being greater than a line width corresponding to the face region.

13. The apparatus according to claim 11, wherein the first target region is a hair region, the second target region is a face region, and the trimap generation code further comprises:

first generation code, configured to cause the at least one processor to generate a first trimap based on the first image and the second image, the first trimap comprising the foreground region, a first line drawing sub-region, and a second line drawing sub-region, the first line drawing sub-region covering a contour line on a side of the hair region that is close to a background region, the second line drawing sub-region covering a contour line of another region, and the another region being a region in the foreground region other than the hair region, a first line width being greater than a second line width, and the first line width being used for drawing the first line drawing sub-region, and the second line width being used for drawing the second line drawing sub-region; and second generation code, configured to cause the at least one processor to generate the target trimap based on the third image and the first trimap.

14. The apparatus according to claim 13, wherein the first generation code is configured to:

obtain a complete contour line of the foreground region in the first image;

draw a line on the complete contour line of the foreground region based on the second line width, to obtain a second trimap, the second trimap comprising the foreground region and a third line drawing sub-region, and the third line drawing sub-region covering the complete contour line of the foreground region;

obtain a complete contour line of the hair region in the second image;

draw a line on the complete contour line of the hair region based on the first line width, to obtain a third trimap, the third trimap comprising the hair region and a fourth line drawing sub-region, and the fourth line drawing sub-region covering the complete contour line of the hair region; and combine the second trimap and the third trimap, to obtain the first trimap.

15. The apparatus according to claim 13, wherein the first line width is M times the second line width, M being greater than 1.

16. The apparatus according to claim 14, wherein the combining code is further configured to:

obtain a first identifier value of each pixel in the second trimap, the first identifier value being used for identifying a color of the pixel in the second trimap;

obtain a second identifier value of each pixel in the third trimap, the second identifier value being used for identifying a color of the pixel in the third trimap; and generate the first trimap based on a magnitude relationship between the first identifier value and the second identifier value.

17. The apparatus according to claim 16, wherein the program code further comprises:

compare code configured to cause the at least one processor to compare a first identifier value of a pixel at any position in the second trimap with a second identifier value of a pixel at the same position in the third trimap; and third identifier code configured to cause the at least one processor to use a maximum of the first identifier value and the second identifier value as a third identifier value of a pixel at the same position in the first trimap, the third identifier value being used for identifying a color of the pixel in the first trimap.

18. The apparatus according to claim 13, wherein the program code includes:

target overlap code configured to cause the at least one processor to determine a target overlap region of the first trimap based on the face region in the third image, the target overlap region being an overlap region between the face region and the second line drawing sub-region; and target identifier value code configured to cause the at least one processor to assign a target identifier value to a pixel in the target overlap region, to generate the target trimap, the target identifier value being used for identifying a color of a pixel in the face region.

19. The apparatus according to claim 11, wherein the program code further includes:

transparency code configured to cause the at least one processor to obtain transparency of each pixel in the original image based on the target trimap, the transparency being used for representing a probability of the pixel belonging to the target object; and matting code configured to cause the at least one processor to perform image matting processing on the original image based on the transparency, to obtain the target image.

20. A non-transitory computer-readable storage medium, storing a computer program that when executed by at least one processor causes the at least one processor to:

perform image semantic segmentation on an original image, to obtain a first image, a second image, and a third image, a foreground region in the first image being a region in which a target object in the original image is located, the second image being a segmented image of a first target region of the target object, and the third image being a segmented image of a second target region of the target object, and, of the first image, sub-regions of the foreground region comprising the first target region and the second target region;

generate a target trimap based on the first image, the second image, and the third image, the target trimap comprising the foreground region and a line drawing region, and the line drawing region being obtained by drawing lines on contours of the foreground region, and different sub-regions of the foreground region being corresponding to different line widths of the lines, and generating the target trimap is further based on the different line widths; and perform image matting processing on the target object in the original image based on the target trimap, to obtain a target image comprising the target object.

* * * * *